(12) United States Patent
Strandberg et al.

(10) Patent No.: US 11,329,544 B2
(45) Date of Patent: May 10, 2022

(54) FILTER ARRANGEMENT

(71) Applicant: Vacon Oy, Vaasa (FI)

(72) Inventors: Stefan Strandberg, Vörå (FI); Nicklas Jan Anders Södö, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 17/097,088

(22) Filed: Nov. 13, 2020

(65) Prior Publication Data

US 2021/0152077 A1  May 20, 2021

(30) Foreign Application Priority Data

Nov. 15, 2019  (DE) .......................... 102019130838.0

(51) Int. Cl.
*H02M 1/12* (2006.01)
*H02M 1/44* (2007.01)

(52) U.S. Cl.
CPC .............. *H02M 1/12* (2013.01); *H02M 1/44* (2013.01); *H02M 1/123* (2021.05)

(58) Field of Classification Search
CPC ........... H02M 1/12; H02M 1/44; H02M 1/123
See application file for complete search history.

(56) References Cited

U.S. PATENT DOCUMENTS

| | | | | |
|---|---|---|---|---|
| 6,867,564 B1* | 3/2005 | Wu | ..................... | H02M 5/4585 318/448 |
| 6,987,372 B1* | 1/2006 | Wu | ..................... | H02M 5/4585 318/448 |
| 2008/0094159 A1 | 4/2008 | Sodo | | |
| 2014/0376293 A1* | 12/2014 | West | ..................... | H02M 7/487 363/131 |
| 2018/0278141 A1* | 9/2018 | Hasegawa | ............. | H02M 5/458 |
| 2019/0028039 A1* | 1/2019 | Sodo | .................. | H02M 1/126 |
| 2021/0151240 A1* | 5/2021 | Strandberg | ............ | H01F 27/263 |

FOREIGN PATENT DOCUMENTS

| | | |
|---|---|---|
| DE | 102008026870 A1 | 12/2009 |
| DE | 102012216693 A1 | 3/2014 |
| DE | 102014115782 A1 | 5/2016 |
| DE | 112016006268 T5 | 10/2018 |

* cited by examiner

*Primary Examiner* — Adolf D Berhane
(74) *Attorney, Agent, or Firm* — McCormick, Paulding & Huber PLLC

(57) ABSTRACT

A filter arrangement in connection with a power converter for transferring power between a multiphase AC voltage network and a DC voltage network. The filter arrangement comprises a differential mode coil coupled between each AC terminal of an inverter bridge and corresponding AC network phase terminal, and a common mode coil coupled between each inverter bridge DC terminal and corresponding DC network terminal. Both inductors are located in the same magnetic core structure such that each of the differential mode winding is wound around its own phase-specific core leg and all common mode windings are wound around their own single core leg. The winding direction of both AC- and DC-side inductor windings is such that a common-mode current which flows along both inductors in the same direction, induces in each magnetic core leg a flux which reinforces the total flux circulating in the magnetic core.

20 Claims, 4 Drawing Sheets

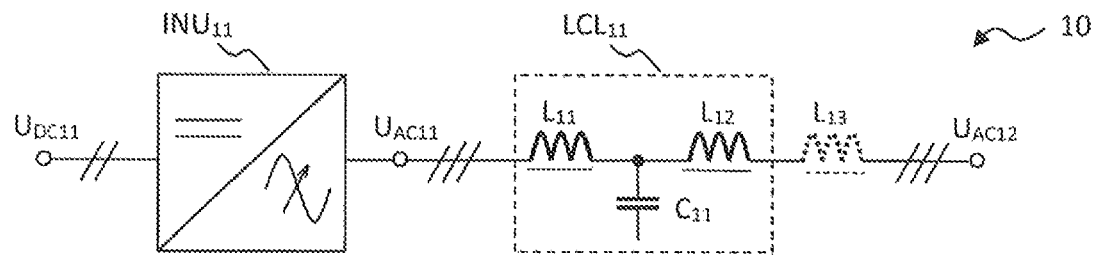
Fig. 1 - Prior Art
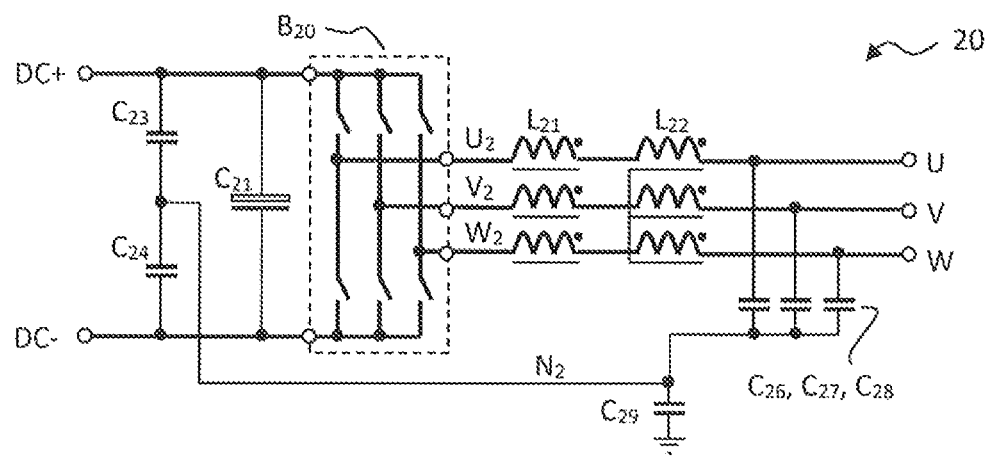
Fig. 2 - Prior Art

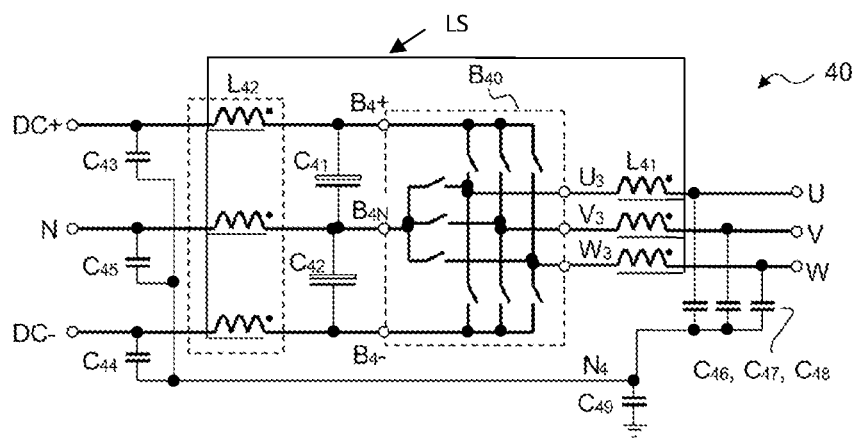
Fig. 4
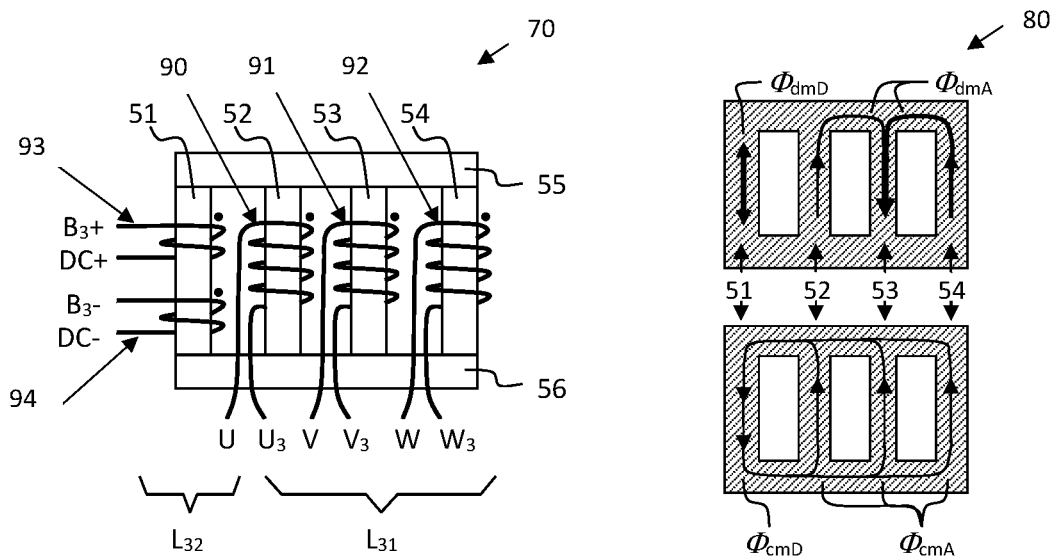
Fig. 5
Fig. 6

FILTER ARRANGEMENT

CROSS-REFERENCE TO RELATED APPLICATION

This application claims foreign priority benefits under 35 U.S.C. § 119 to German Patent Application No. 102019130838.0 filed on Nov. 15, 2019, the content of which is hereby incorporated by reference in its entirety.

TECHNICAL FIELD

The present invention relates to a filter arrangement in connection with a power converter for transmitting power between a direct-current "DC" voltage network and a multiphase alternating current "AC" voltage network. Furthermore, the invention relates to electric power distribution systems wherein power converters are employing a filter arrangement according to the present invention may be applied.

BACKGROUND

Inverters are widely used in power electronics applications in conversion between DC power and AC power. The most common inverter type, PWM-inverter, converts a DC supply voltage into an AC output voltage consisting of pulses with varying widths. The output voltage is here formed by a so-called pulse width modulation "PWM" method, with an objective to form the output voltage pulse pattern with a desired fundamental component and minimum content of disadvantageous harmonics.

The instantaneous average value of the PWM voltage pattern is not zero as e.g. in a three-phase symmetric sinusoidal voltage waveform but varies within the DC supply voltage range. An average voltage value other than zero forms a common voltage component for all phases, generating so-called common mode current which circulates in both the DC and AC networks connected to the device and may cause harmful effects to the environment. With generally used modulation methods the common mode voltage and generated common mode current is the higher, the lower is the value of the inverter output AC voltage. In some applications pulse-shaped voltage is not acceptable, so the output AC voltage needs to be filtered closer to sinusoidal waveform. This is the case e.g. in many renewable energy applications, wherein the generated electric power is fed to public energy distribution grid.

A commonly used filter solution in PWM applications is the so-called LCL filter, coupled between the inverter output terminals and the electric power distribution network as presented in FIG. 1. An LCL filter normally comprises a capacitive filter, coupled between a first and a second inductive filter. The disadvantage of this filter type is the inductive components, which typically are large and heavy, producing considerably power losses. Thus, the filter requires proper enclosure and an efficient cooling arrangement. In order to limit the common mode current, also an additional common mode coil may be needed in this filter arrangement. On the whole, the LCL filter increases the size and cost of the installation remarkably.

Another known filter solution in PWM applications comprises a series connection of inductors in conjunction with a capacitive filter arrangement, as presented in FIG. 2. In a preferred embodiment of this filter, the inductors are located on the same magnetic core structure such that each of the differential mode windings are wound around its own core leg and all common mode windings are wound around a common single core leg, as presented in the example of FIG. 5. A drawback of this filter is that the total AC current, i.e. all of its differential mode and common mode components, must flow along both inductors coupled in series. Especially in an operating point with simultaneous low AC output voltage and high output current, the common mode coil is simultaneously loaded with a worst case common mode current and worst case differential mode current. This situation must therefore be taken as the basis for the design of the common mode coil and magnetic core leg. Another drawback of this filter is that it may be difficult to place all windings of the common mode coil around the same core leg.

SUMMARY

The objective of the present invention is to provide a novel filter arrangement for a power converter between a DC voltage network and a multiphase AC voltage network. The inventive filter arrangement avoids the disadvantages of the prior art, like a heavy LCL filter circuit or dimensioning of a common mode coil at simultaneous worst case differential and common mode current components. The objective of the invention is achieved by what is stated in independent claim, other preferred embodiments are disclosed in the dependent claims.

According to the present invention, a filter arrangement (10, 20, 30, 40) in connection with a power converter for transferring power between an alternating current "AC" voltage network and a direct-current "DC" network is provided. The power converter comprises an inverter bridge with AC terminals and DC terminals. The filter arrangement includes a first inductor ($L_{11}$, $L_{21}$, $L_{31}$, $L_{41}$), comprising differential mode coils between each inverter bridge AC terminal and a corresponding AC network connection, and a first capacitor group ($C_{11}$, $C_{21}$-$C_{24}$, $C_{31}$-$C_{34}$, $C_{41}$-$C_{44}$), comprising a capacitor between each power converter DC network connection and a star point ($N_2$, $N_3$, $N_4$), and a second capacitor group ($C_{26}$-$C_{28}$, $C_{36}$-$C_{38}$, $C_{46}$-$C_{48}$), comprising a capacitor between each power converter AC network connection and the star point ($N_2$, $N_3$, $N_4$), characterized in that the filter arrangement further includes a second inductor ($L_{32}$, $L_{42}$), comprising common mode coils between each DC terminal of the inverter bridge and the corresponding DC network connection, where the first inductor and second inductor are magnetically coupled (LS) via a common magnetic core structure.

According to the present invention, the filter arrangement comprises a differential mode coil coupled between each AC terminal of an inverter bridge and corresponding AC network phase terminal, and a common mode coil coupled between each inverter bridge DC terminal and corresponding DC network terminal. According to the invention, both inductors are located in the same magnetic core structure such that each of the differential mode winding is wound around its own phase-specific core leg and all common mode windings are advantageously wound around their own single core leg. The inductor coils are winded around their magnetic core legs such that a common mode current, which flows between the DC and AC networks along both inductors in the same direction, induces in each magnetic core leg a flux which reinforces the total flux which circulates in the magnetic core.

According to an embodiment of the invention, the DC-side common mode inductor structure includes also a differential mode inductivity such that the differential mode inductivity is less than 15% of the common mode inductivity.

According to an embodiment of the invention, the filter arrangement comprises also a capacitive coupling between the DC and AC network terminals. An advantageous filter arrangement includes a first capacitor group, comprising a capacitor between each DC network terminal and a star point, and a second capacitor group, comprising a capacitor between each AC network terminal and the star point.

According to an embodiment of the invention, the star point of the capacitive filter arrangement is coupled to ground via a capacitor.

According to the invention, the network of capacitors $C_{43}$-$C_{49}$ and $C_{33}$-$C_{39}$ is coupled from the AC network to the DC network in order to filter common mode current.

According to an embodiment of the invention, the invented filter arrangement is employed in a system, wherein the connected AC network has at least 2 phases and the connected DC network has at least 2 poles.

According to an embodiment of the invention, a power converter provided with the invented filter arrangement is employed to transmit power between a DC network and a multiphase AC network in a system wherein the power to the DC network is supplied by a battery, by a rectified AC network or by a renewable source, such as a solar panel or a wind turbine.

According to an embodiment of the invention, a power converter provided with the invented filter arrangement is employed to transmit power between a DC network and a multiphase AC network in a system wherein the power to the AC network is supplied by an AC generator or by an AC network.

According to an embodiment of the invention, a power converter provided with the invented filter arrangement is employed to transmit power between a DC network and a multiphase AC network in a system wherein the DC network is loaded by a battery charger or by an AC motor via an inverter.

According to an embodiment of the invention, a power converter provided with the invented filter arrangement is employed to transmit power between a DC network and a multiphase AC network in a system wherein the AC network is loaded by an AC network or by an AC motor.

According to an embodiment of the invention, the inventive filter arrangement is up to 30% more efficient than Prior Art e.g. LCL filter and Siemens DE102008026870A1, at modulation index of 0,4. (100)

BRIEF DESCRIPTION OF THE DRAWINGS

Below the invention appears a more detailed explanation using examples with references to the enclosed figures, wherein FIG. 1 presents a prior art filter arrangement, FIG. 2 presents a prior art filter arrangement, FIG. 4 presents a filter arrangement according to the present invention, FIG. 5 presents an inductor structure according to the present invention, FIG. 6 illustrates magnetic flux flow in the inductor magnetic core according to the present invention.

DETAILED DESCRIPTION

FIG. 1 presents a simplified main circuit diagram of a prior art power converter 10 for transmitting power between a multiphase AC voltage network $U_{AC12}$ and a DC voltage network $U_{DC11}$, shown as a single line drawing. In the converter arrangement, the supplying DC voltage $U_{DC11}$ is inverted into a three phase AC voltage $U_{AC11}$ by an inverter unit $INU_{11}$. The output voltage $U_{AC11}$ consists of pulses whose height is the DC voltage of the intermediate circuit of the inverter unit $INU_{11}$. This voltage can normally not be connected to a public power distribution grid, due to the high content of the harmful harmonics of its pulse-like voltage shape. Therefore, this connection must be made through a heavy filter that removes most of the harmful harmonics. Normally the filter, such as $LCL_{11}$ in FIG. 1, consists of a first differential mode inductance $L_{11}$, a second differential mode inductance $L_{12}$ and a capacitance $C_{11}$ between the inductances. In order to limit the common mode current supplied to the AC network, also an additional common mode inductor $L_{13}$ may be necessary in the filter arrangement.

FIG. 2 presents main circuit diagram of another prior art power converter 20 for transmitting power between a DC voltage network having poles DC+, DC− and filtered by an energy storage capacitor $C_{21}$, and a 3-phase AC voltage network having phases U, V, W. The inverter bridge $B_{20}$, shown in a simplified form as being obvious for a person skilled in the art, generates a 3-phase output AC voltage having phases $U_2$, $V_2$, $W_2$. Due to the pulsed-shape, the output voltage is filtered closer to sinusoidal waveform using a filter arrangement which includes a 3-phase differential mode coil $L_{21}$ and a 3-phase common mode coil $L_{22}$, connected in series between inverter AC terminals $U_2$, $V_2$, $W_2$ and corresponding network terminals U, V, W. The filter arrangement further includes a first capacitor group $C_{23}$, $C_{24}$ between each DC voltage network pole DC+, DC− and a star point $N_2$, and a second capacitor group $C_{26}$-$C_{28}$ between each AC voltage network phase U, V, W and the star point $N_2$. The star point $N_2$ can be connected to earth potential via capacitor $C_{29}$.

Figure 3:
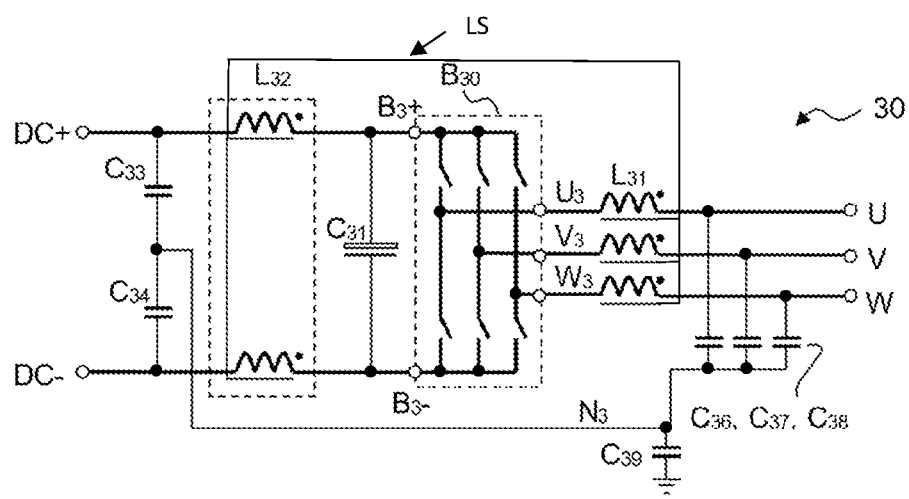
FIG. 3 presents a filter arrangement according to the present invention.

FIG. 3 presents main circuit diagram of a power converter 30 for transmitting power between a DC voltage network and a 3-phase AC voltage network. The inverter bridge $B_{30}$ is here similar to that of power converter 20. An energy storage filter capacitor $C_{31}$ is coupled to the DC terminals $B_3$+, $B_3$− of bridge $B_{30}$.

According to the present invention, the filter arrangement in power converter 30 comprises a common mode coil $L_{32}$ on the DC voltage network side of the inverter bridge, one winding on both lines between inverter terminals $B_3$+, $B_3$−, and corresponding DC network poles DC+, DC−. Otherwise the filter arrangement is close to that of power converter 20, including a 3-phase differential mode coil $L_{31}$ between inverter AC terminals $U_3$, $V_3$, $W_3$, and corresponding AC network phases U, V, W. The solid lines next to the inductor symbols represent magnetic core legs of the inductor coils. The capacitive filter in this exemplary embodiment of the invention comprises a first capacitor group $C_{33}$, $C_{34}$ between each DC voltage network pole DC+, DC−, and a star point $N_3$, and a second capacitor group $C_{36}$-$C_{38}$ between each AC voltage network phase U, V, W, and the star point $N_3$. The star point $N_3$ can be connected to earth potential via capacitor $C_{39}$.

As is known, at constant output current the inverter DC input power is the lower, the lower is the AC output frequency. Thus, also DC input current is low at low output frequencies, which brings a remarkable benefit when using the filter arrangement of the present invention due to low power losses in the common mode inductor. In prior art, with all inductors placed on the AC side of the inverter, inductor current and current-proportional losses are not dependent on the output frequency.

The novel idea does not set limitations to number of AC network phases, e.g. 1-phase AC supply is possible although 3-phase networks are used in the examples in this document. Also the number of DC network poles can be higher than 2. FIG. 4 presents an example of main circuit diagram of a power converter 40, wherein an inverter bridge $B_{40}$ can form a 3-step output AC voltage pattern from a dual polarity DC voltage supply. Since these kinds of inverter bridge types, like NPC, TNPC, ANPC etc. are familiar to a person skilled in the art, the bridge is presented here in simplified form only. According the present invention, the filter arrangement comprises a common mode coil $L_{42}$ on the DC network side of the inverter bridge, one winding between each inverter DC terminal $B_4+$, $B_{4N}$, $B_4-$, and corresponding DC network poles DC+, N, DC−. Otherwise the filter arrangement is similar to that of power converter 30, including energy storage filter capacitors $C_{41}$, $C_{42}$ at both polarities of the DC supply, a first filter capacitor group $C_{43} \ldots C_{45}$ between each DC network pole and a star point $N_4$, a second filter capacitor group $C_{46} \ldots C_{48}$ between each AC network phase and the star point $N_4$, and a capacitor $C_{49}$ for grounding the star point $N_4$.

FIG. 5 presents principal structure of an advantageous exemplary embodiment of an inductor according to the present invention. The magnetic core of the inductor comprises 4 legs 51-54 which are connected by yokes 55, 56. The 3-phase differential mode coil $L_{31}$ is formed by the windings around legs 52 ... 54. The common mode coil $L_{32}$ is formed by the windings around a single leg 51. Small black dot next to each winding indicate the direction of winding rotation around a leg, and markings next to winding ends indicate inductor connections to other parts of the converter circuitry in FIG. 3. It should be noted that the common mode coil windings can also be assembled around separate core legs instead of the single leg 51 presented above.

FIG. 6 illustrates magnetic flux flow in a magnetic core of FIG. 5. In the figure, the lined area depicts the magnetic core, and the legs are marked by numbers 51-54 like in FIG. 5.

The upper part of the figure illustrates flux flow without common mode current component in the power converter circuit. In this situation, the currents of both windings around leg 51 are equal but opposite (i.e. current from DC+ to $B_3+$ is equal to current from $B_3-$ to DC− in FIG. 3), thus also the magnetic fluxes $\phi_{dmD}$ they create in leg 51 are equal and cancel each other out. This means that the common mode coil has no effect on the converter operation in this situation. The current of each differential mode coil winding around legs 52-54 creates its own magnetic flux. Normally the sum of the output currents is zero, thus also the sum of fluxes $\phi_{dmA}$ in legs 52-54 is zero and no part of these fluxes circulates via leg 51 (i.e. in spite of the common mechanical structure the common mode coil and differential mode coil have no effect on each other).

The lower part of the figure illustrates flux flow with common mode current in the power converter circuit (common mode current=current which flows between the connected DC and AC networks to the same direction in all main circuit lines, e.g. from DC+ to $B_3+$ and DC− to $B_3-$ in FIG. 3). In this situation, the direction of currents of both windings around leg 51 are the same, thus also the direction of magnetic fluxes $\phi_{cmD}$ they create are the same and reinforce each other. The same common mode current flows also via the differential mode coil $L_{31}$ phases and, due to direction of inductor winding rotation around their core legs, further reinforces the circulating magnetic flux $\phi_{cmA}$ in legs 52-54. Thus, in this common mode situation, all windings reinforce the circulating magnetic flux which means that all windings constitute an impedance to the common mode current flow, which is advantageous in terms of reduction of the common mode current.

Figure 7:
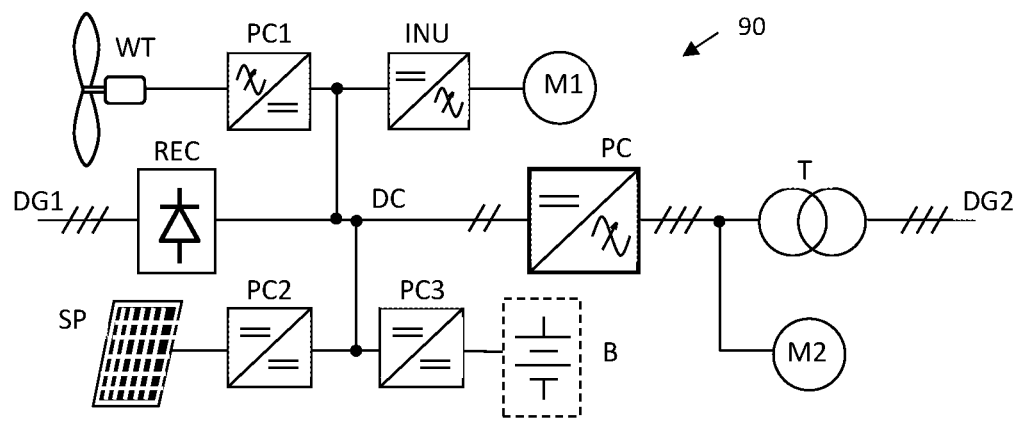
FIG. 7 presents an electric power distribution system according to the present invention.
Figure 8:
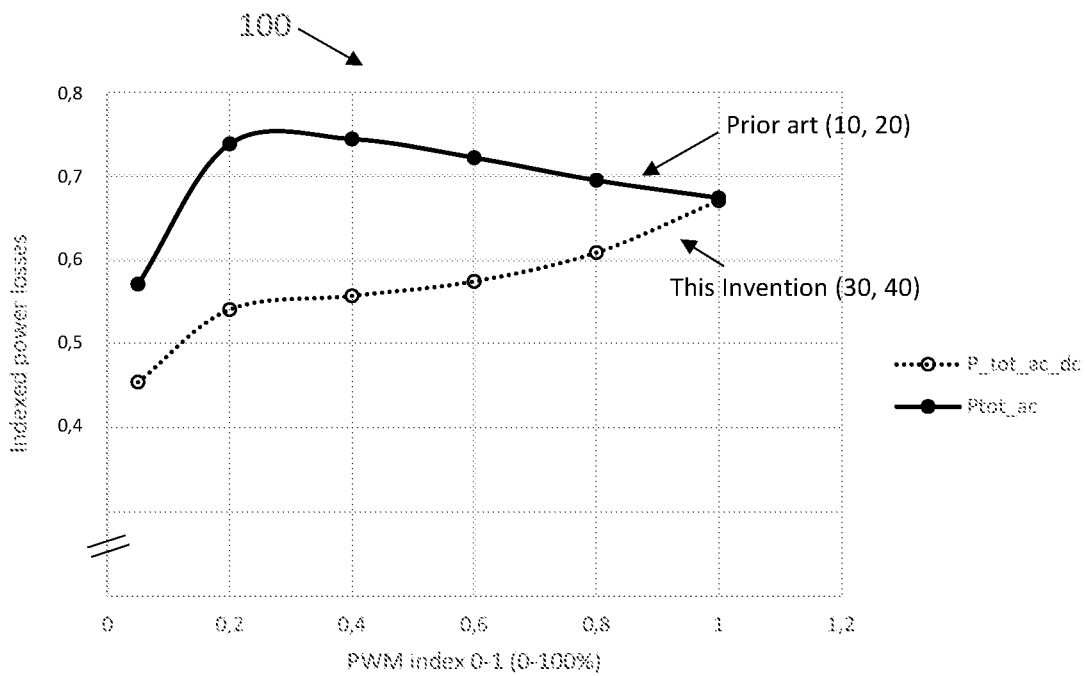
FIG. 8 presents in the graphic, the power losses for the inventive filter arrangement in comparison with Prior Art.

FIG. 7 presents examples of electric power distribution systems wherein a power converter PC employing a filter arrangement according to the present invention can be applied. The figure shows at the principle level various alternatives which, however, do not necessarily occur simultaneously in a real system.

In the example system, the electric power to the system can be supplied to the DC voltage network by a wind turbine WT via a power converter PC1, by a solar panel SP via a power converter PC2, by an electric power distribution grid DG1 via a rectifier REC or by a battery B via a power converter PC3. It is also possible that the power to the system is supplied from the AC side by an electric power distribution grid DG2 directly or via a transformer T, or by an AC machine M2 working as a generator.

In the example system, the electric power from the system can be supplied via the DC voltage network to motor M1 via an inverter INU or to a battery via a battery charger PC3. It is also possible that the power from the system is supplied to the AC side loads, like a motor M2 or to an AC voltage grid directly or via a transformer T.

Noteworthy is, that if many inverter units with local energy storage capacitors are connected to a common DC voltage network, the current of the DC voltage link may be increased due to a harmful resonance phenomenon due to apart capacitors and the DC link stray inductance between them. Therefore, an extra inductance in the DC link may be beneficial, in order to decrease the resonance frequency and dampen it. According to the invention, the common mode inductance can contain a small amount of differential mode inductivity, advantageously less than 15% of the common mode inductivity, in order to fulfil this need.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

What is claimed is:

1. A filter arrangement in connection with a power converter for transferring power between an alternating current "AC" voltage network and a direct-current "DC" network, the power converter comprising an inverter bridge with AC terminals and DC terminals, and the filter arrangement including a first inductor, comprising differential mode coils between each inverter bridge AC terminal and a corresponding AC network connection, and a first capacitor group, comprising a capacitor between each power converter DC network connection and a star point, and a second capacitor group, comprising a capacitor between each power converter AC network connection and the star point wherein the filter arrangement further includes a second inductor, comprising common mode coils between each DC terminal of the inverter bridge and the corresponding DC network connection, where the first inductor and second inductor are magnetically coupled via a common magnetic core structure.

2. The filter arrangement of claim 1, wherein the first and second inductor wires are wound to a core structure such that all common mode coil windings are wound around a common core leg, each differential mode coil wire is wound around its own magnetic core leg, and the ends of the magnetic core legs are connected to each other by magnetic core yoke parts.

3. The filter arrangement of claim 1, wherein the direction of rotation of each winding around its magnetic core leg is such that a common mode current, which flows along the first and second inductor in the same direction, induces in each magnetic core leg a flux which reinforces the total flux circulating in the magnetic core.

4. The filter arrangement of claim 1, wherein the second inductor includes also differential mode inductivity such that the differential mode inductance is less than 15% of the common mode inductance.

5. An electric power distribution system, wherein a power converter employing a filter arrangement of claim 1 transmits power between an AC voltage network and a DC voltage network, wherein the AC voltage network has at least 2 phases and the DC voltage network has at least 2 poles.

6. An electric power distribution system, wherein a power converter employed by a filter arrangement of claim 1 transmits power between an AC voltage network and a DC voltage network, wherein the power to the DC network is supplied by a battery, by a rectified AC network or by a renewable source, such as a solar panel or a wind turbine.

7. An electric power distribution system, wherein a power converter employed by a filter arrangement of claim 1 transmits power between an AC voltage network and a DC voltage network, wherein the power to the AC network is supplied by an AC generator or by an AC network.

8. An electric power distribution system, wherein a power converter employed by a filter arrangement of claim 1 transmits power between an AC voltage network and a DC voltage network, wherein the DC network is loaded by a battery charger or by an AC motor via an inverter.

9. An electric power distribution system, wherein a power converter employed by a filter arrangement of claim 1 transmits power between an AC voltage network and a DC voltage network, wherein the AC network is loaded by an AC network or by an AC motor.

10. The filter arrangement of claim 2, wherein the direction of rotation of each winding around its magnetic core leg is such that a common mode current, which flows along the first and second inductor in the same direction, induces in each magnetic core leg a flux which reinforces the total flux circulating in the magnetic core.

11. The filter arrangement of claim 2, wherein the second inductor includes also differential mode inductivity such that the differential mode inductance is less than 15% of the common mode inductance.

12. The filter arrangement of claim 3, wherein the second inductor includes also differential mode inductivity such that the differential mode inductance is less than 15% of the common mode inductance.

13. An electric power distribution system, wherein a power converter employing a filter arrangement of claim 2 transmits power between an AC voltage network and a DC voltage network, wherein the AC voltage network has at least 2 phases and the DC voltage network has at least 2 poles.

14. An electric power distribution system, wherein a power converter employing a filter arrangement of claim 3 transmits power between an AC voltage network and a DC voltage network, wherein the AC voltage network has at least 2 phases and the DC voltage network has at least 2 poles.

15. An electric power distribution system, wherein a power converter employing a filter arrangement of claim 4 transmits power between an AC voltage network and a DC voltage network, wherein the AC voltage network has at least 2 phases and the DC voltage network has at least 2 poles.

16. An electric power distribution system, wherein a power converter employed by a filter arrangement of claim 2 transmits power between an AC voltage network and a DC voltage network, wherein the power to the DC network is supplied by a battery, by a rectified AC network or by a renewable source, such as a solar panel or a wind turbine.

17. An electric power distribution system, wherein a power converter employed by a filter arrangement of claim 3 transmits power between an AC voltage network and a DC voltage network, wherein the power to the DC network is supplied by a battery, by a rectified AC network or by a renewable source, such as a solar panel or a wind turbine.

18. An electric power distribution system, wherein a power converter employed by a filter arrangement of claim 4 transmits power between an AC voltage network and a DC voltage network, wherein the power to the DC network is supplied by a battery, by a rectified AC network or by a renewable source, such as a solar panel or a wind turbine.

19. An electric power distribution system, wherein a power converter employed by a filter arrangement of claim 2 transmits power between an AC voltage network and a DC voltage network, wherein the power to the AC network is supplied by an AC generator or by an AC network.

20. An electric power distribution system, wherein a power converter employed by a filter arrangement of claim 3 transmits power between an AC voltage network and a DC voltage network, wherein the power to the AC network is supplied by an AC generator or by an AC network.

* * * * *